United States Patent
Park et al.

(10) Patent No.: US 11,914,984 B2
(45) Date of Patent: Feb. 27, 2024

(54) FIRMWARE UPDATING METHOD USING LOW-POWER WIRELESS NETWORK

(71) Applicant: CIOT INC, Busan (KR)

(72) Inventors: Hyeonju Park, Yongin-si (KR); Hanna Park, Incheon (KR)

(73) Assignee: CIOT INC, Busan (KR)

( * ) Notice: Subject to any disclaimer, the term of this patent is extended or adjusted under 35 U.S.C. 154(b) by 0 days.

(21) Appl. No.: 17/238,750

(22) Filed: Apr. 23, 2021

(65) Prior Publication Data
US 2021/0240465 A1 Aug. 5, 2021

Related U.S. Application Data

(63) Continuation of application No. PCT/KR2018/013092, filed on Oct. 31, 2018.

(30) Foreign Application Priority Data

Oct. 23, 2018 (KR) .................. 10-2018-0127069

(51) Int. Cl.
*G06F 9/44* (2018.01)
*G06F 8/65* (2018.01)
*G06F 8/71* (2018.01)
*H04L 67/00* (2022.01)

(52) U.S. Cl.
CPC .................. *G06F 8/65* (2013.01); *G06F 8/71* (2013.01); *H04L 67/34* (2013.01)

(58) Field of Classification Search
CPC ... G06F 8/65; G06F 8/71; H04L 67/34; H04L 63/0876; H04L 9/3234
See application file for complete search history.

(56) References Cited

U.S. PATENT DOCUMENTS

| | | | |
|---|---|---|---|
| 10,437,581 B1* | 10/2019 | Patil | H04L 67/12 |
| 2008/0052698 A1* | 2/2008 | Olson | G06F 9/44536 717/168 |
| 2018/0150289 A1* | 5/2018 | Adrangi | H04L 67/34 |
| 2018/0336024 A1* | 11/2018 | Klische | H04L 9/30 |
| 2020/0259655 A1* | 8/2020 | Woo | H04L 63/0428 |

FOREIGN PATENT DOCUMENTS

KR 20100063474 A 6/2010

OTHER PUBLICATIONS

Dennis K. Nilsson and Ulf E. Larson, Secure Firmware Updates over the Air in Intelligent Vehicles, 978-1-4244-2052-0/08/$25.00 © 2008 IEEE, p. 380-384 (Year: 2008).*
International Search Report issued in PCT/KR2018/013092; dated Jul. 22, 2019.

* cited by examiner

*Primary Examiner* — Lewis A Bullock, Jr.
*Assistant Examiner* — Mohammad H Kabir
(74) *Attorney, Agent, or Firm* — Studebaker & Brackett PC

(57) ABSTRACT

The present disclosure relates to a firmware updating method using a low-power wireless network, and more specifically, to a firmware updating method using a low-power wireless network, which is designed to upgrade a firmware installed on a terminal installed in a vehicle, such as a navigation system, by using a low-power wireless network.

1 Claim, 8 Drawing Sheets

FIRMWARE UPDATING METHOD USING LOW-POWER WIRELESS NETWORK

CROSS-REFERENCE TO RELATED APPLICATIONS

The present application is a continuation of International Patent Application No. PCT/KR2018/013092, filed on Oct. 31, 2018, which is based upon and claims the benefit of priority to Korean Patent Application No. 10-2018-0127069, filed on Oct. 23, 2018. The disclosures of the above-listed applications are hereby incorporated by reference herein in their entirety.

TECHNICAL FIELD

The present disclosure relates to a firmware updating method using a low-power wireless network, and more particularly, to a firmware updating method using a low-power wireless network, which is implemented to wirelessly upgrade a firmware on a terminal installed in a vehicle, such as a navigation system, by using the low-power wireless network.

BACKGROUND ART

With the development of wireless communication technology, terminals including various services and functions for user convenience are being provided. Due to the addition of various services and functions, the probability of many bugs occurring in a software installed on a mobile terminal is increasing as well, and a demand for an addition of new functions after a release of a mobile terminal is increasing.

Accordingly, firmware over the air (FOTA), a solution that automatically upgrades a firmware of a mobile terminal wirelessly, was developed. Here, the firmware generally refers to a micro program that controls hardware stored in a ROM, and the firmware is the same as software in terms of the program, but distinguished from general application software in that the firmware has a close relationship with hardware, and thus, the firmware has characteristics of both of the software and hardware.

Referring to the FOTA-related standard established by the international mobile standard standardization organization, open mobile alliance (OMA), the FOTA service execution process of the mobile terminal is a process of receiving a notification message from a device management (DM) server, a discovery process, which is a process for performing communication between the DM server and the mobile communication terminal, and a process of downloading an update package.

Therefore, the FOTA service has the advantage that users may download a modified program of the mobile terminal wirelessly without visiting an A/S center and update the downloaded program immediately.

Meanwhile, machine to machine (M2M) is a remote management and control solution that supports communication between machines for a series of user traffic data on a general wired/wireless network by interlocking an M2M module and a device using wired/wireless communication methods. In addition, various programs such as non volatile (NV) setting values, firmware, drivers, and applications are required to be updated for reasons such as performance improvement and error correction of the M2M module and the device connected thereto. However, even if each program is updated, each updated program is managed for each version, and therefore, an error may occur or an improved service may not be used when any one of the updated programs is not updated.

DISCLOSURE

Technical Problem

An aspect of the present disclosure provides a firmware updating method using a low-power wireless network, which is implemented to wirelessly upgrade a firmware on a terminal installed in a vehicle, such as navigation, by using the low-power wireless network.

Another aspect of the present disclosure provides a firmware updating method using a low-power wireless network, which is implemented to receive a firmware provided by a manufacturer by dividing a firmware file into multiple pieces even if performance of a target terminal for firmware over the air (FOTA) is not excellent.

The technical problems of the present disclosure are not limited to the above-mentioned technical problems. That is, other technical problems that are not mentioned may be obviously understood by those skilled in the art from the following specification.

Technical Solution

In an aspect, a firmware packaging and unpackaging method includes: dividing, by a download server, a firmware input from a manufacturer server into a plurality of blocks; and encrypting, by the download server, the divided blocks, in which the blocks divided in the dividing are composed of a first block including a firmware name and a firmware version, a plurality of firmware blocks that are arranged in order after the first block and are each allocated part of firmware data to form one firmware data as a whole, and a last block arranged after the last firmware block to notify a termination of the packaging, and in the encrypting, the firmware block is divided into a header and a body, an output value when firmware data is used as an input of a hash function and a sign value obtained by substituting, as an input, the output value when the firmware data is used as the input of the hash function are input to the header, and a value obtained by encrypting the firmware data is input to the body.

The preparing of the update may include: a version checking step of reading whether a firmware update of the target terminal is necessary through an info value included in the first block after a target terminal communicating with the download server decodes the first block and comparing an info value whose sign and hash are released and an info value previously included in the first block when the firmware update is necessary; and a data merging step of comparing the hash value of the firmware data whose sign is released and the hash value of the firmware data previously included in the firmware block after the target terminal downloads and decodes the firmware blocks when the version is checked in the version checking step, and merging each of the firmware data divided when the hash value of the firmware data whose sign is released is equal to the hash value of the firmware data previously included in the firmware block.

In another aspect, a firmware updating method using a low-power wireless network includes: receiving and registering information of a target terminal on which the firmware is updated in an update manager server from a manufacturer server; checking information of a firmware version on the target terminal using the low-power wireless network in a platform managing the update of the firmware on the target terminal; receiving the update firmware from the manufacturer server in a download server and packaging the received update firmware to the target terminal; downloading the packaged firmware from the download server in the target terminal through the low-power wireless network; and performing the firmware update by unpackaging the firmware packaged in the target terminal.

The registering of the terminal may include: receiving and registering, by the update manager server, manufacturer information of the target terminal and vehicle terminal information on which the target terminal is installed from the manufacturer server; storing the manufacturer information and the vehicle terminal information registered by the update manager server in a database; receiving and registering, by the platform, the manufacturer information and the vehicle terminal information from the update manager server; receiving, by the update manager server, a token which is a unique ID corresponding to the vehicle terminal information from the platform; transmitting the token received from the update manager server to the manufacturer server; and receiving, by the target terminal, the token from the manufacturer server, the checking of the firmware version includes: periodically transmitting, by the target terminal, the information of the firmware version to the platform; and checking, by the update manager server, the information of the firmware version on the target terminal transmitted to the platform, the packaging of the firmware may include: receiving, by the download server, the firmware from the manufacturer server; packaging the firmware received by the download server to create a firmware for transmission to which division and security are applied; storing the firmware for transmission created by the download server in the database; uploading a firmware download directory (URL) of the firmware for transmission created by the download server to the update manager server; creating, by the update manager server, a firmware update notice; transmitting, by the update manager server, the created firmware update notice to the platform; transmitting the firmware update notification received by the platform to the target terminal; and transmitting, by the update manager server, a transmission result of the firmware update notice to the manufacturer server, the downloading of the firmware may include: downloading, by the target terminal, the firmware for transmission from the download server; transmitting, by the target terminal, the download result to the platform; checking, by the update manager server, the download result through the platform; and transmitting, by the update manager server, the download result to the manufacturer server, and the updating of the firmware may include: preparing the firmware update by unpackaging the firmware for reception received by the target terminal; performing, by the target terminal, the firmware update when the preparation of the update is completed; transmitting, by the target terminal, the result of the firmware update to the platform; checking, by the update manager server, the result of the firmware update through the platform; and transmitting, by the update manager server, the result of the firmware update to the manufacturer server.

The creation of the firmware for transmission may include: dividing, by a download server, a firmware input from a manufacturer server into a plurality of blocks; and encrypting the divided blocks, in which the blocks divided in the dividing may be composed of a first block including a firmware name and a firmware version, a plurality of firmware blocks that are arranged in order after the first block and are each allocated part of firmware data to form one firmware data as a whole, and a last block arranged after the last firmware block to notify an end of the packaging, and in the encrypting, the firmware block may be divided into a header and a body, an output value when firmware data is used as an input of a hash function and a sign value obtained by substituting, as an input, the output value when the firmware data is the input of the hash function may be input to the header, and a value obtained by encrypting the firmware data may be input to the body.

The preparing of the update may include: a version checking step of reading whether a firmware update of the target terminal is necessary through an info value included in the first block after the first block is decoded and comparing an info value whose sign and the hash are released when the firmware update is necessary and an info value already included in the first block when the firmware update; and a data merging step of comparing the hash value of the firmware data whose sign is released and the hash value of the firmware data previously included in the firmware block after the firmware blocks are downloaded and decoded when the version is checked in the version checking step, and merging each of the firmware data divided when the hash value of the firmware data whose sign is released is equal to the hash value of the firmware data previously included in the firmware block, and in the performing of the firmware update, when the decoding of the last block is completed, the firmware update may be performed using the merged firmware data.

Advantageous Effects

According to one aspect of the present disclosure described above, by performing a firmware update using a low-power wireless network, a firmware provided by a manufacturer may be divided and transmitted to an FOTA target terminal, so even if the wireless network situation or the performance of the FOTA target terminal is not excellent, the firmware provided by the manufacturer may be transmitted without burden.

BEST MODE

Figure 1:
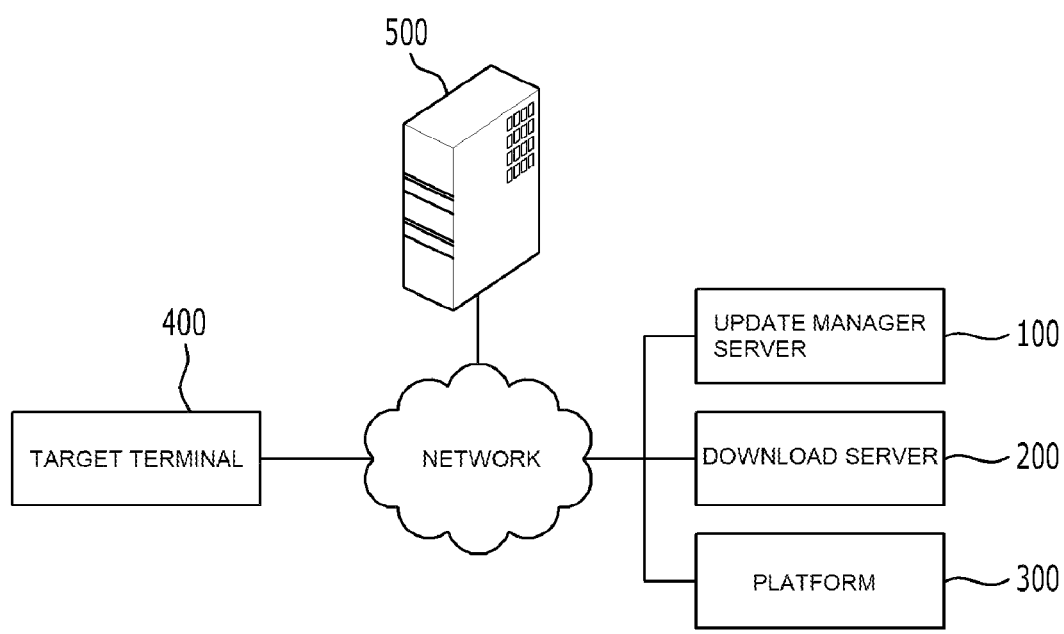
FIG. 1 is a diagram illustrating a relationship between an update manager server, a download server, a platform, a target terminal, and a manufacturer server.

A detailed description of the present disclosure to be described later refers to the accompanying drawings illustrating a specific embodiment in which the present disclosure may be implemented as an example. These embodiments will be described in detail sufficient to enable a person skilled in the art to practice the present disclosure. It should be understood that the various embodiments of the present disclosure are different, but need not be mutually exclusive. For example, specific shapes, structures, and characteristics described herein may be implemented in another embodiment without departing from the spirit and the scope of the present disclosure in connection with an embodiment. In addition, it should be understood that a position or an arrangement of individual components in each disclosed exemplary embodiment may be changed without departing from the spirit and the scope of the present disclosure. Therefore, a detailed description described below should not be construed as being restrictive. In addition, the scope of the present disclosure is defined only by the accompanying claims and their equivalents if appropriate. Similar reference numerals will be used to describe the same or similar functions throughout the accompanying drawings.

Hereinafter, preferred embodiments of the present disclosure will be described in more detail with reference to the drawings.

FIG. 1 is a diagram illustrating a relationship between an update manager server, a download server, a platform, a target terminal, and a manufacturer server according to the present disclosure.

In FIG. 1, the network is a low-power wireless network, and LTECatm.1 or the like may correspond thereto.

According to an embodiment of the present disclosure, a firmware packaging and unpackaging method includes: dividing, by a download server, a firmware input from a manufacturer server into a plurality of blocks; and encrypting, by the download server, the divided blocks, in which the blocks divided in the dividing are composed of a first block including a firmware name and a firmware version, a plurality of firmware blocks that are arranged in order after the first block and are each allocated part of firmware data to form one firmware data as a whole, and a last block arranged after the last firmware block to notify an end of the packaging, and in the encrypting, the firmware block is divided into a header and a body, an output value when firmware data is used as an input of a hash function and a sign value obtained by substituting, as an input, the output value when the firmware data is the input of the hash function are input to the header, and a value obtained by encrypting the firmware data is input to the body.

In an embodiment, the firmware packaging and unpackaging method further includes: a version checking step of reading whether a firmware update of the target terminal is necessary through an info value included in the first block after a target terminal communicating with the download server decodes the first block and comparing an info value whose sign and hash are released and an info value previously included in the first block when the firmware update is necessary; and a data merging step of comparing the hash value of the firmware data whose sign is released and the hash value of the firmware data previously included in the firmware block after the firmware blocks are downloaded and decoded when the target terminal finishes checking the version in the version checking step, and merging each of the firmware data divided when the hash value of the firmware data whose sign is released is equal to the hash value of the firmware data previously included in the firmware block.

It is obvious that the firmware packaging and unpackaging method may correspond to a step of creating the firmware for transmission and a step of preparing the update of the firmware updating method using the low-power wireless network.

Figure 2:
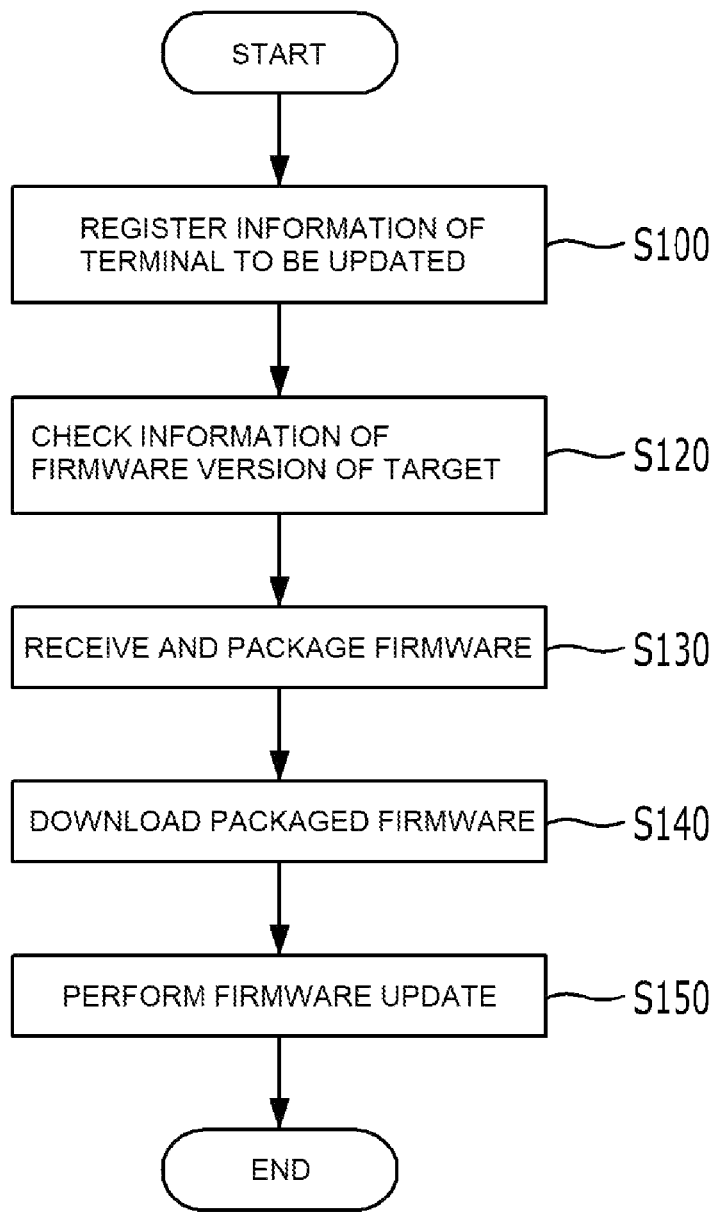
FIG. 2 is a flowchart describing a firmware updating method using a low-power wireless network according to an embodiment of the present disclosure.

FIG. 2 is a diagram describing the firmware updating method using the low-power wireless network according to the embodiment of the present disclosure.

Referring to FIG. 2, the firmware updating method using the low-power wireless network according to the embodiment of the present disclosure first receives and registers information of a target terminal 400, which is a target of a firmware update in an update manager server 100, from a manufacturer server 500 (S110).

Here, the target terminal 400, which is a device that is installed on a vehicle, such as navigation, is a device that periodically or non-periodically updates a firmware. For example, the target terminal 400 may be a vehicle to everything (V2X) infotainment device of a smart car, or the like.

Accordingly, the target terminal 400 needs to further perform a communication function (for example, Cat m.1), a F/W download client manager, update authentication, terminal authentication, Secure FO TA unpackaging API, Core Crypto, a boot loader, and the like.

Figure 3:
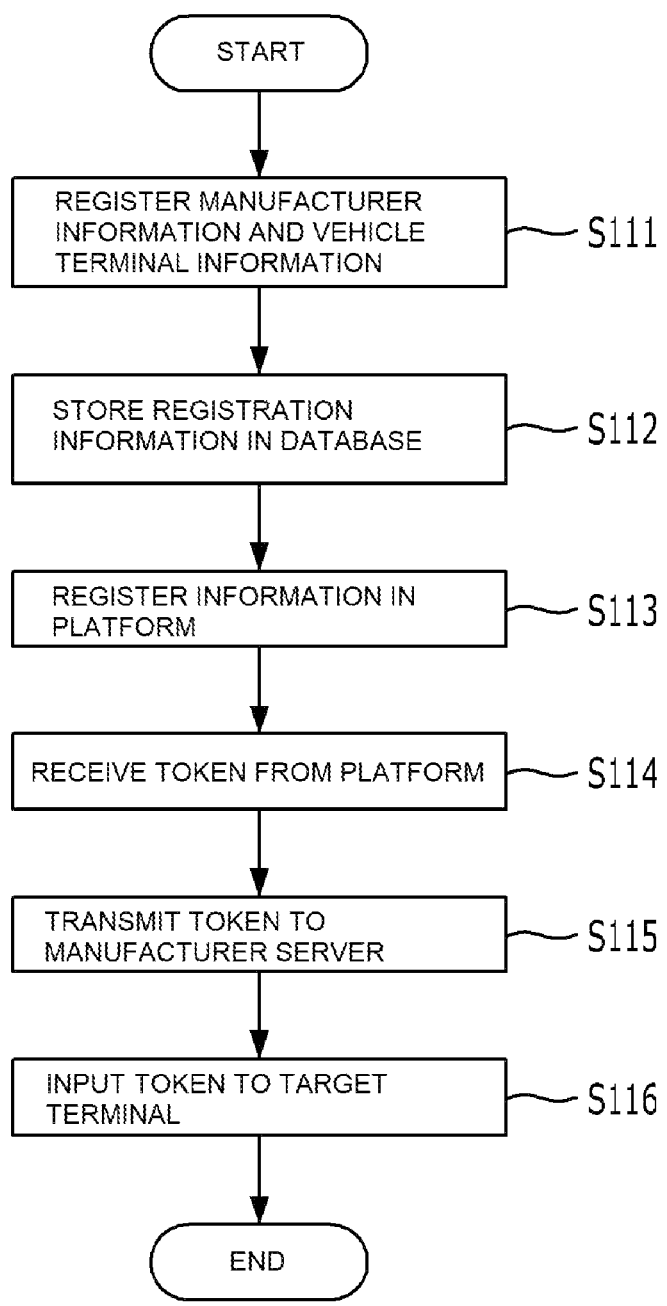
FIG. 3 is a flowchart describing a terminal registering step of FIG. 2.

Referring to FIG. 3, the terminal registering step (S110) may include receiving and registering, by the update manager server 100, manufacturer information of the target terminal 400 and information of vehicle terminal (that is, model information) on which the target terminal 400 is installed from the manufacturer server 500 (S111), storing the manufacturer information and the vehicle terminal information registered by the update manager server 100 in a database (S112), receiving and registering, by a platform 300, the manufacturer information and the vehicle terminal information from the update manager server 100 (S113), receiving, by the update manager server 100, a token, which is a unique ID corresponding to the vehicle terminal information, from the platform 300 (S114), transmitting the token received by the update manager server 100 to the manufacturer server 500, and receiving, by the target terminal 400, from the manufacturer server 500 (S116).

In the platform 300 that manages the firmware update of the target terminal 400, the firmware version information of the target terminal 400 is checked using the low-power wireless network (for example, LTE Cat.M1) (S120).

In this case, the platform 300 may transmit and receive data through the update manager server 100 and a representational state transfer (REST) API.

Figure 4:
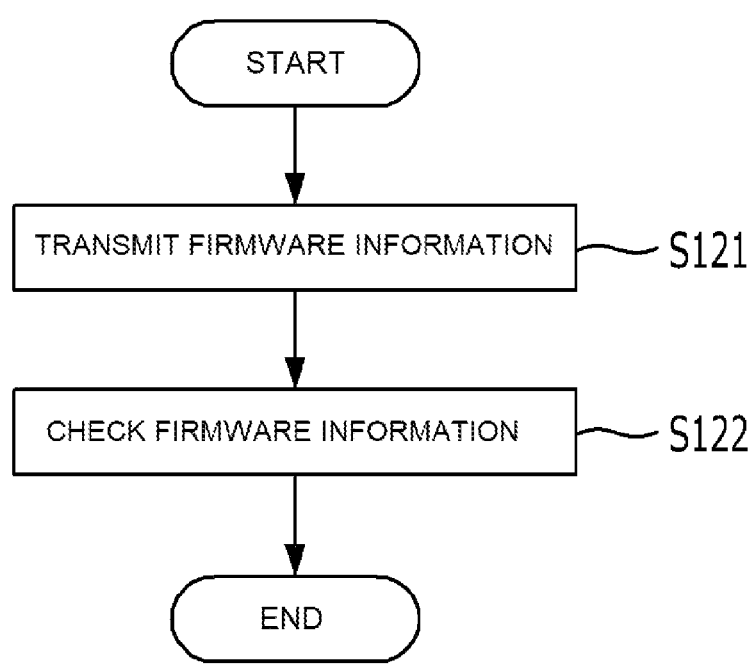
FIG. 4 is a flowchart describing a firmware version checking step of FIG. 2.

Referring to FIG. 4, in the firmware version checking step (S120), first, the target terminal 400 may periodically perform transmitting its own firmware version information to the platform 300 (S121).

In an embodiment, the information transmitted to the platform 300 by the target terminal 400 in addition to the firmware version information is shown in Table 1 below.

TABLE 1

| Item | KEY | TYPE | Contents |
|---|---|---|---|
| Telemetrics (period report) | latitude | number | Latitude |
| | longitude | number | Longitude |
| | speed | number | Speed |
| | runtime | number | Accumulated running time after starting |

TABLE 1-continued

| Item | KEY | TYPE | Contents |
|---|---|---|---|
| | distance | number | Accumulated distance after starting |
| | idletime | number | Idle time after starting |
| | bv | number | Battery voltage |
| | totaldistance | number | Total accumulated distance |
| | fuel | number | Fuel consumption after starting |
| | offcount | number | Number of starting |
| | acc | number | Starting information |
| | shock | number | Shock information |
| | fwupdate | number | Update state |
| Attributes (attribute report) | attmanufacturer | string | Manufacturer |
| | attmodel | string | model name |
| | attserial Number | string | SN |
| | attfwVer | String | Firmware version |
| | atthwVer | string | Hardware version |
| | attcarNumber | string | Car number |

In Table 1, the period report and the attribute report are information that the target terminal 400 transmits to the platform 300, in which the period report is information that is reported at regular intervals of a minute or more, and specifically, the period report is information that is reported about once every 5 minutes, and the attribute report is information that is reported about once every 24 hours. In this case, the firmware version information transmitted from the above-described target terminal 400 to the platform 300 is "attfwVer, string, and firmware version" among the attribute reports.

After the above-described step S121, the update manager server 100 performs checking the firmware version information of the target terminal 400 transmitted to the platform 300 in the above-described step S121 (S122).

The download server 200 receives the update firmware from the manufacturer server 500 and packages the received update firmware to be transmitted to the target terminal 400 (S130).

Figure 5:
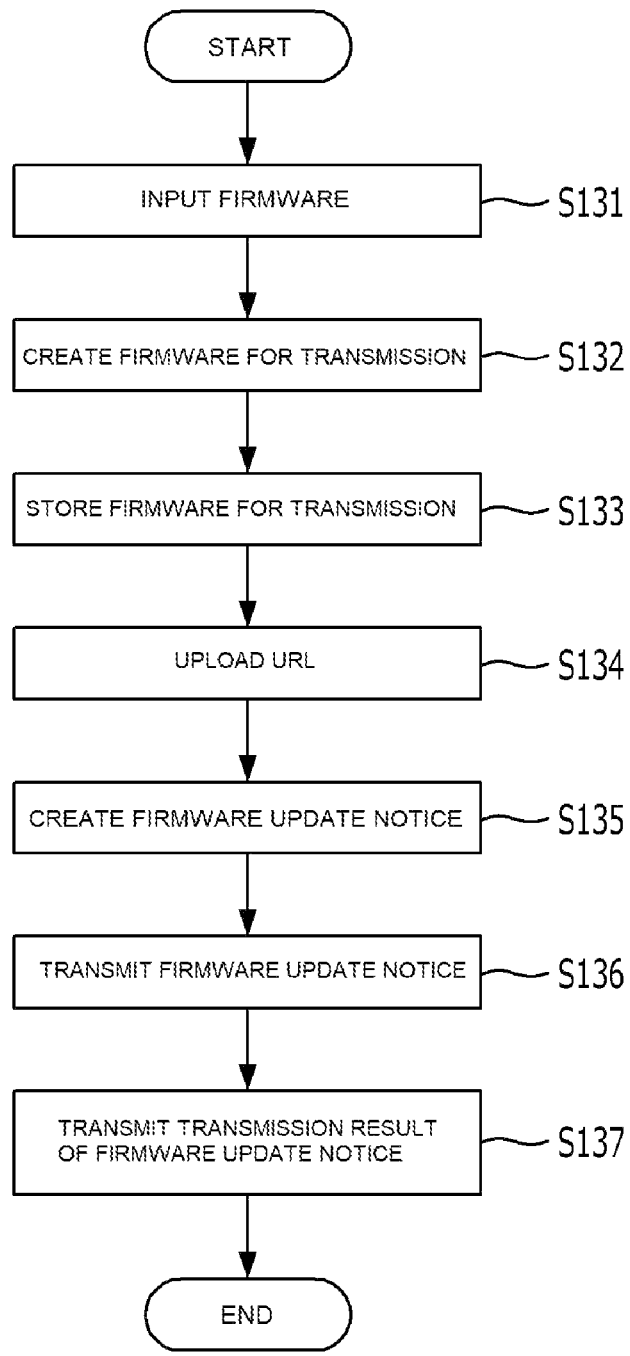
FIG. 5 is a flowchart describing a firmware packaging step of FIG. 2.

Referring to FIG. 5, the firmware packaging step (S130) may include receiving, by the download server 200, the firmware from the manufacturer server 500 (S131), packaging the firmware received by the download server 200 (here, the packaging for crating a firmware for transmission means dividing and applying the firmware file) to create a firmware for transmission to which division and security are applied (S132), storing the firmware for transmission created by the download server 200 in the database (S133), uploading a firmware download directory (URL) of the firmware for transmission created by the download server 200 to the update manager server 100 (S134), creating, by the update manager server 100, a firmware update notice (S135), transmitting, by the update manager server 100, the created firmware update notice to the platform 300 (S136), transmitting the firmware update notice received from the platform 300 to the target terminal 400 (S137), and transmitting, by the update manager server 100, a transmission result of the firmware update notice to the manufacturer server 500 (S137).

In this case, the information included in the firmware update notice transmitted from the platform 300 to the target terminal 400 is shown in Table 2 below.

TABLE 2

| METHOD | KEY | TYPE | DESCRIPTION | REMARK |
|---|---|---|---|---|
| Fw_update | site | string | FOTA address | |
| | port | number | FOTA port | |
| | url | string | Firmware download directory | |
| | number | number | Number of firmware files | |
| | version | string | Firmware version | |
| | filename | string | Firmware file start name | |

In Table 2, the FOTA address is the URL created in the step of creating the above-described firmware (S132), and the number of firmware files means the number of divided files.

In the past, the firmware on the terminal that is a target of the FOTA is updated by wire, but in the present disclosure, the update is performed using the low-power wireless network, and in order to implement the system itself chiefly, a low-performance FOTA target terminal is set to be a target.

Accordingly, by the firmware packaging step (S130) according to the present disclosure, the firmware provided by the manufacturer may be transmitted without burden even in the low-power situation or even if the performance of the target terminal 400 of the FOTA is not excellent.

In an embodiment, in the step of creating of the firmware for transmission (S132), first, the firmware input from the manufacturer server 500 may be divided into a plurality of blocks, and then the divided blocks may be encrypted.

Since the existing firmware for update is composed of a header and encrypt (firmware) including a sign (H (firmware)), a firmware name, a firmware version, and a sign key (manufacturer's private key), and a body including an encryption key (derivation from a seed key value), there is a disadvantage that the transmission burden may not only increase through the network, but the download and execution burden may also be increased as the terminal receiving the transmission.

As a result, according to the present disclosure, the firmware is divided into a plurality of blocks and each block is encrypted and transmitted, so the firmware provided by the manufacturer may be received even if the performance of the terminal 400 which is a target of the firmware over the air (FOTA) is not excellent.

Here, the blocks divided in the dividing step in the step of creating the firmware for transmission (S132) may be composed of a first block including a firmware name and a firmware version, a plurality of firmware blocks that are arranged in order after the first block and are each allocated part of firmware data to form one firmware data as a whole, and a last block arranged after the last firmware block to notify a termination of the packaging.

In this case, a size of each firmware block varies depending on the wireless network. The size of the firmware block may be specifically 4 KB.

Next, in the encrypting step in the step of creating the firmware for transmission (S132), the firmware block may be divided into a header and a body, an output value when firmware data is used as an input of a hash function and a sign value obtained by substituting, as an input, the output value when the firmware data is the input of the hash function may be input to the header, and a value obtained by encrypting the firmware data may be input to the body.

That is, each firmware block is composed of one header and one body.

Figure 6:
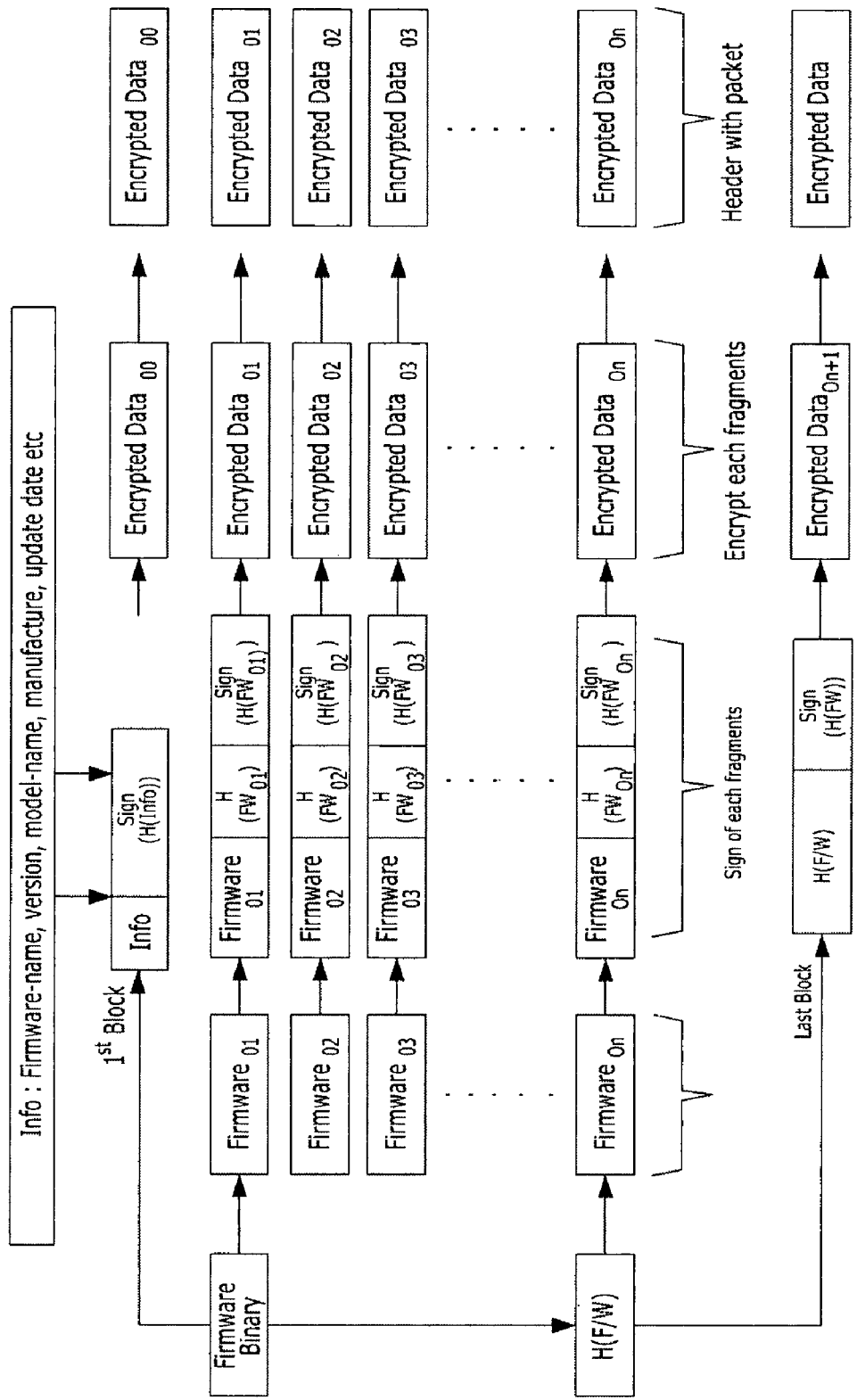
FIG. 6 is a diagram describing a creation of a firmware for transmission to which division and security are applied by the step of creating the firmware for transmission of FIG. 5.

FIG. 6 is a diagram describing a creation of a firmware for transmission to which division and security are applied by the creating of the firmware for transmission (S132) of FIG. 5.

Referring to FIG. 6, data (that is, encrypted $Data_{cc}$ $Data_{cc}$) encrypted with "info" and "sign(H(Info))" is stored in the first block, data (that is, Encrypted $Data_{c1}$ $Data_{c1}$ to Encrypted $Data_{cn}$ $Data_{cn}$) encrypted with the "firmware name", the "output value when the firmware data is used as input to the hash function", and the "sign value obtained by substituting the output value as the input when the firmware data is used as the input of the hash function" is stored in each firmware block, and data (that is, Encrypted $Data_{cn-1}$ $Data_{cn-1}$) encrypted with "H(F/W)" and "Sign(H(FW))" is stored in the last block.

Here, the " sign value obtained by substituting the output value as input when the firmware data is used as the input of the hash function is optional. That is, in the present disclosure, the case of hashing the firmware and then signing, and only the case of hashing the firmware may be included in the firmware block.

In the target terminal 400, the packaged firmware from the download server 200 is downloaded through the low-power wireless network (for example, LTE Cat.M1) (S140).

Figure 7:
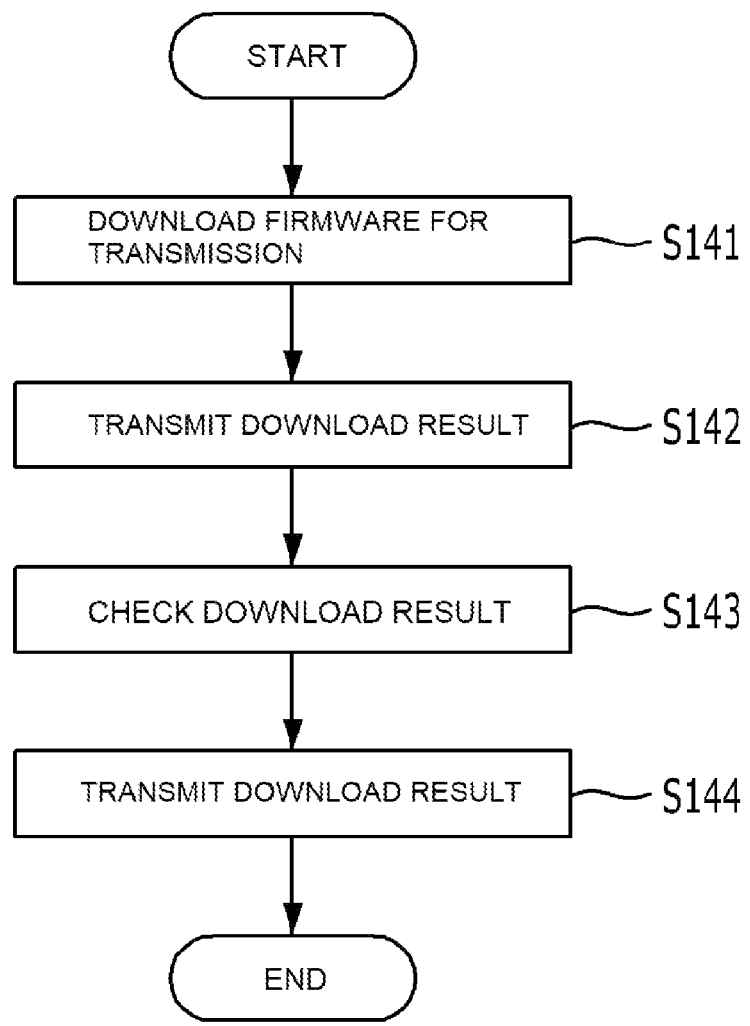
FIG. 7 is a flowchart describing a firmware downloading step of FIG. 2.

Referring to FIG. 7, the firmware downloading step (S140) may include downloading, by the target terminal 400, the firmware for transmission from the download server 200 (S141), transmitting, by the target terminal 400, the download result to the platform 300 (S142), checking, by the update manager server 100, the download result through the platform 300 (S143), and transmitting, by the update manager server 100, the download result to the manufacturer server 500 (S144).

In this time, the firmware download is automatically performed at a specific time, for example, at 4 am the next day when the protocol is received, the firmware download is performed when the vehicle driving is finished, when the download is not completed normally, the previously downloaded file is disregard, and the file download newly starts again, and the issue is separately managed when the download fails three times or more.

The firmware update is performed by unpackaging the firmware packaged in the target terminal 400 (S150).

Figure 8:
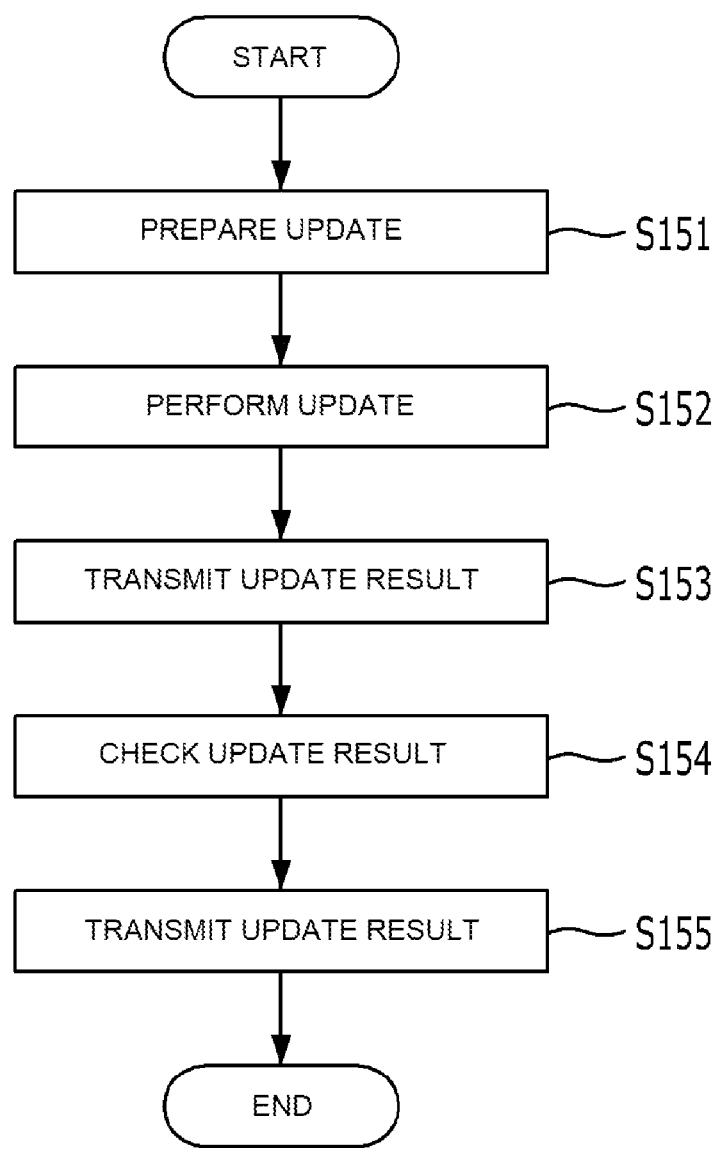
FIG. 8 is a flowchart describing a firmware updating step of FIG. 2.

Referring to FIG. 8, the firmware updating step (S150) may include preparing the firmware update by unpackaging the firmware received by the target terminal 400 (S151), performing, by the target terminal 400, the firmware update when the preparation of the update is completed (S152), transmitting, by the target terminal 400, the result of the firmware update to the platform 300 (S153), checking, by the update manager server 100, the result of the firmware update through the platform 300 (S154), and transmitting, by the update manager server 100, the result of the firmware update to the manufacturer server 500 (S155).

In this case, when the vehicle is turned off, it is checked whether the firmware is updated and the update proceeds, and the unpackaged firmware is loaded into the memory at the same time as the firmware is unpackaged.

In an embodiment, the preparing of the update (S151) may include a version checking step of reading whether the firmware update of the target terminal 400 is necessary through an info value included in the first block after the first block is decoded and comparing an info value whose sign and hash are released and the info value previously included in the first block when the firmware update is necessary, and then a step of comparing the hash value of the firmware data whose sign is released and the hash value of the firmware data previously included in the firmware block after the firmware blocks are downloaded and decoded when the version is checked, and merging each of the firmware data divided when the hash value of the firmware data whose sign is released is equal to the hash value of the firmware data previously included in the firmware block.

In the step of performing the firmware update (S152), when the decoding of the last block is completed, the firmware update may be performed using the merged firmware data.

According to the present disclosure, each server will perform a function such as a communication function (for example, Catm.1), an F/W upload manager, an F/W service web-based UI, firmware management (version, F/W), SecureFOTA, packaging API, and Core Crypto.

The update manager server 100 performing the functions as described above in 7 may include a backup file decentralization module (not illustrated in the drawing for convenience of explanation).

The backup file decentralization module creates, as a backup file, the important information such as the user information or the system information to be protected from external attacks such as hacking or ransomware, and then sequentially creates and stores the created backup file as a primary backup file and a secondary backup file including the same data but stores the primary backup file and the secondary backup file in different storage locations.

However, the backup file is not created only primarily and secondarily, and it is possible to create three or more backup files in consideration of the performance of the system or the like.

The backup file decentralization module changes the storage location of the primary backup file and the secondary backup file that have been stored at a preset period (for example, it is not limited to the set period, but may be set to a period designated by the user, such as once every 3 hours to once every 5 hours, which is the basically set period in the system) to the preset location on the system or a newly created location.

In this case, it is preferable that the movement location of the backup file is designated as a folder or sub-folder created according to a random variable, not a location previously set on the system or designated by the user.

Accordingly, it is possible to prevent the existence of a folder where the file to be attacked by an attacking program such as hacking or ransomware is located or the location of the folder from being predicted and prevent the folder from being attacked easily, but also prevent sensitive data such as customer information, which should not be deleted, from being accidentally deleted or modified by a user's mistake.

In the present disclosure, the primary backup file and the secondary backup file are files including data of the same contents, and there is no superiority or inferiority therebetween. Regarding the movement of the file, the secondary backup file may move after the primary backup file moves, or the primary backup file may move after the secondary backup file moves.

In an embodiment, when an intrusion from the outside is detected, the backup file decentralization module may continuously duplicate the previously created primary and secondary backup files to create a plurality of sub-backup files of each backup file, and also individually store a plurality of created sub-backup files in different locations created according to random variables.

Accordingly, by dividing and storing the plurality of backup files sporadically created on the system into arbitrary locations, even if some of the backup files are lost or deleted by an attack, the backup files that exist sporadically on the system are used to be able to easily restore necessary data.

Next, the backup file decentralization module permanently deletes a file determined to be a currently attacked backup file from among the plurality of backup files on the system.

Accordingly, in the present disclosure, by deleting files that may turn into zombie programs, which may not perform normal functions on the system due to hacking, ransomware attacks, or the like or may expose other files on the system due to the attack, from the system, it is possible to prevent the entire system from being attacked by some files.

In an embodiment, when the backup file is stored in a synchronization folder linked with a cloud service, if the backup file has been stored in the synchronization folder and the stored backup file is uploaded to the cloud, the backup file decentralization module may release the synchronization for that synchronization folder.

For example, when the cloud service for the user synchronization is called "Dropbox", the function of the backup file decentralization module as described above by using the "selective synchronization service" provided by the "Dropbox" is implemented.

That is, when the backup file decentralization module creates, on the system, the "backup folder" as a space for storing the backup file, the cloud service creates a newly created "backup folder" on the cloud in the same manner.

Next, the backup file decentralization module will store the backup file in the corresponding folder, and thus, the corresponding backup file is also uploaded to the cloud.

Finally, when the upload of the backup file to the cloud is completed, the backup file decentralization module selectively releases only the synchronization for the "backup folder" used for uploading the backup file, and deletes the "backup folder" on the system.

In this case, by releasing the synchronization of only the "backup folder" that is temporarily created for using the upload of the backup file, not releasing the synchronization of the entire system, the stable synchronization service with the cloud service is continuously performed, whereas as the backup file is uploaded to the cloud and then is deleted from the system, the backup file is safely stored on the cloud and may be fundamentally prevented from being continuously exposed to attacks that are infiltrated into the system.

In an embodiment, when it is time to change the storage location of the backup file uploaded on the cloud, the backup file decentralization module may again perform the synchronization of the folder from which the selective synchronization is released to download the backup file uploaded to the cloud service and to move the downloaded backup file to a newly created location according to a random variable as described above.

The update manager server 100 having the above-described configuration may be implemented on a development environment management system (not illustrated in the drawing for convenience of description).

In the development environment, a number of developers use a number of development systems for software development, and each development system may develop and directly manage software components and software under the control of the developers. Each development system uses a trusted platform module (TPM) standard technology, so software components can be used only in the licensed development system. The trusted platform module (TPM) is a kind of security device and may create and manage security keys for data encryption.

The development environment management system may restrict developer's authority for the use of the software components, and may perform security authentication for the development system used by the developer.

When receiving a software component creation or modification permission request message from the development system, the development environment management system may process the software component creation or modification permission request message by checking the authority information of the development system.

Here, the software component may be configured to include at least one of a source code, a binary including debugging information, a pure binary including no the debugging information, a document for clarification of a code, and a process equation model for understanding the code.

The authority information may be configured to include at least one of authority to read the software component, a storage authority to create, modify, and store a software component, and authority to adjust the authority information.

When the software component is created or modified by any one development system that satisfies the authority information, the development environment management system may control so that the created or modified software component can be stored and used by other development systems. This is because there are cases where the module built by one development system needs to be used in other development systems.

The development environment management system may build a database that stores the history of the creation or modification of these software components. This is because it is possible to track how a value of a specific variable has changed step by step through the history information, and to understand how the specific variable has influenced the change of the value of any other variable.

Specifically, the development environment management system may create the history information including the type of software component, whether or not the software component is created/modified, the date of the creation/modification of the software component, the frequency of creation/modification of the software component, and the authority information of the development system that creates/modifies the software component.

The development environment management system may assign an index whenever it creates history information and store the index in the history information database.

In this case, the development environment management system may build the history information database for each type of software component. That is, the development environment management system may build the history information database according to the importance of the software component, and the history information database of the software component corresponding to the type with the highest importance may be excluded from the database update object for storage space management, as described later.

Alternatively, the development environment management system may build the history information database for each date of the creation/modification of the software component. For example, the development environment management system may build the history information database of a specific date and exclude the corresponding history information database from the database update target.

Alternatively, the development environment management system may build the history information database for each authority information. For example, the development environment management system may build the history information database of the software component by the development system corresponding to the authority to adjust the authority information considered as the highest authority information, and exclude the corresponding history information database from the database update target.

As described above, the development environment management system may update the history information database for efficient storage space management.

Specifically, the development environment management system may update the history information database when the index of the history information database reaches a preset index.

For example, the development environment management system may divide the entire index of the history information database into three sections in ascending order.

The development environment management system may delete the history information corresponding to the section including the lowest index among the three sections without conditions. The history information corresponding to the corresponding section may be regarded as the creation/modification date has elapsed for a long time. As a result, the corresponding history information is less likely to be referred again, and thus may be deleted without conditions.

The development environment management system may update the history information corresponding to the middle section of the three sections by determining whether to delete or maintain the history information according to the type of software component. In other words, the development environment management system may classify the importance according to the type of software component, and may update the history information database in a manner that only the history information corresponding to the type of software component having the highest importance among the history information corresponding to the middle section of the three sections is maintained, and all the remaining history information database is deleted.

Alternatively, the development environment management system may update the history information corresponding to the middle section of the three sections by determining whether to delete or maintain the history information according to the type of software component. That is, the history information database may be updated in a manner that all the history information whose creation/modification frequency is higher than a preset reference frequency in the history information corresponding to the middle section among three sections and the remaining history information is maintained.

Alternatively, the development environment management system may update the history information corresponding to the middle section of the three sections by determining whether to delete or maintain the history information according to the authority information of the development system. In other words, the history information database may be updated in a manner that the history information, which is the authority to adjust the authority information whose authority information is considered as the highest authority information, is maintained as it is, and all the remaining history information is deleted.

The development environment management system may maintain the history information corresponding to the section including the highest index among the three sections as it is. The history information corresponding to the corresponding section may be regarded as having a relatively recent creation/modification date, and the possibility of re-referencing the history information is high, and therefore, may be maintained as it is.

Some of the components of the update manager server 100 having the configuration as described above may be implemented by artificial intelligence, and may further include a decision-making reason presentation unit (not illustrated in the drawing for convenience of description).

The decision-making reason presentation unit not only predicts classification 0 for the data given or input by the user, but also analyzes the causal relationship for the decision to find an appropriate basis, and thus, the reason why such results presented by artificial intelligence are likely to be produced may be clear at the user level. By enabling reliable decision-making between the user and the artificial intelligence through the decision-making reason presentation unit, the feedback from the user in the event of a problem or error may be appropriately reflected. In addition, by providing the decision-making reason presentation unit, the cause of why the results presented by the artificial intelligence come out may not be clearly described, and therefore, the user's distrust of the artificial intelligence may be resolved, and in case of performing the excessive learning, it is possible to prevent the over-fitting problem that an optimal solution within a region may be selected rather than an optimal solution from the overall perspective.

In an embodiment, the decision-making reason presentation unit may further include a model building module and a reason explanation interface module. The model building module can be implemented as a deep explanation learning module, an interpretable model generation module, and a model induction module.

The deep explanation learning module is a modified deep learning technology, and enables the deep neural network to learn features that can be described. It may learn to show meaningful attributes of nodes in a hidden layer. For example, when a model that distinguishes images of the arms and legs is learned, each hidden node is learned to represent a shape of a fingernail or toenail, a shape of a finger or a toe, a position of a palm or a sole, and the like, and when the model determines an image as a hand, the basis of the determination may be found through the activated hidden node. The basis for the determination may also be expressed linguistically through a natural language generation model such as a recurrent neural network (RNN). The RNN is a model of deep learning and is a kind of an artificial neural network. The RNN is for learning data that changes over time, such as time series data, and uses an input control vector, a forgetting vector, and an output control vector to obtain input and output data. In the input control vector, a value is received after the input signal passes through a connection layer with an activation function, and the forgetting vector plays a role of reflecting a part of the past input to the current input. The output control vector takes into account the past value and the modified input value, and accepts the value using the activation function. The final result is returned to the input again. Such a circulatory neural network is mainly used for classifying document emotions or recognizing handwritten text, and may be mainly used for voice recognition, time series prediction, or waveform generation. This is because input data may be processed in an appropriate order even if it is a fixed shape without order.

In addition, in an embodiment, the deep explanation learning module may visually display a part that is based on an image. For example, when the artificial intelligence system classifies a cat image, the existing system only derives whether the input image is a cat, but the deep explanation learning module derives whether it is a cat, and its basis (hair, whiskers, etc.) image may be provided to a user.

The interpretable model generation module may build structured data into an interpretable causal model. According to an embodiment, the interpretable model generation module may be built using the bayesian program learning (BPL), and the BPL is a method of learning to express a combination of small pieces. For example, when learning a model to create letters, the BPL divides the letters into strokes to create the combinations of most reasonable strokes. The BPL may be imitated as it is when viewed once like a person without a large amount of data, and is an evolution of the neural network (neural network model). When a new event is given, the BPL may change a probability value based on that event. In other words, the BPL does not only change only weights are assigned to virtual variables, but also includes content that creates other virtual variables in the middle. Given a new environment, it is to understand the phenomenon in a different method. For example, when a coin is tossed 100 times, the head of the coin comes out 60 times, the back of the coin comes out 40 times, and thus, the probability that the head comes out is 60%. If the back comes out the next time, the method is a method that lowers the probability that the head comes out to 59.4%.

In addition, in an embodiment, the interpretable model generation module may be implemented through a probabilistic approach. The probabilistic approach may produce a learning effect with just a few samples. For example, when showing a long chair and a short chair, the probabilistic approach is similar to learning that there are also medium-length chairs. In other words, it is a skill to learn by filling out insufficient data by itself. Depending on the embodiment, the probabilistic approach may include a function of correcting the probability and program by itself through a mathematical calculation.

In addition, in an embodiment, the interpretable model generation module may be implemented using And-Or-Graph. The And-Or-Graph (AND/OR graph) represents the condition and conclusion relationship of the rule and the AND/OR relationship in graph form, and has the advantage that it is easy to logically explain the decision process of the model because intermediate and final data derived by the artificial intelligence are structured. In other words, it shows the AND node and the OR node graph. All AND nodes need to be processed, and the OR node may be terminated if only one node is processed. Using the AND/OR graph, the set of rules scattered from each other may be shown as a single structure, and the logical relationship between each sentence may be easily understood.

The model induction module may infer an arbitrary black box model as an explainable model. In an embodiment, the model induction module may be implemented as local interpretable model-agnostic explanations, and the LIME may make an arbitrary black box model locally explainable through sparse linear combination around data that can already be explained. For example, when the black box model that classifies images determines an image as a hand a heart, the black box model may present an explanation of a heart of another model that may already be explained, that is, the basis for determining which part is the heart by comparing pixels representing the heart with a given image.

In addition, according to an embodiment, the model induction module may be implemented as the bayesian rule lists (BRL) expressing a model as a series of if-then conditional statements. The BRL divides high-dimensional, multi-variable feature spaces into simple and already interpretable conditional statements, thereby understanding a complex model.

The above-described deep explanation learning module, the interpretable model generation module, and the model induction module may operate independently of each other or in combination with each other, and the implementation order may also vary according to embodiments.

Next, the reason explanation interface module may express the explanation of the decision-making of the artificial intelligence in a way that a user may understand. The reason explanation interface module may include, as required items, items that the presented explanation should be repetitive, all necessary explanations should be included, unnecessary explanations should not be included, the quantity should be appropriate, and the like. That is, it is possible to provide users with whether the artificial intelligence easily derives the final result based on any processes and reasons, and what factors or data influences each step, including language, tables, images, graphs, formulas, etc.

In addition, the reason explanation interface module may receive a user's correction command. To this end, the reason explanation interface module may include, as required items, items that the explanation of the correction possibility should be flexible, the user's feedback should be respected, and the gradual change should be observed, and the like. For the description presented in this way, it is possible to evaluate and develop the effect of the reason explanation interface module by receiving feedback of the clarity, utilization, and the like of the explanation from the user.

In another embodiment, the decision-making reason presentation unit may be formed as a causal relationship model. The causal model may be formed in the form of combining deep learning and the Marcov random field. First, a probability distribution of a deep Markov random field model is modeled from the training data, and the structure of the Markov random field representing conditional independence between random variables is learned. The latent function of the Markov random field whose structure is learned may be inferred with a deep neural network to alleviate the problem that the number of parameters required for the latent function increases exponentially as the number of input variables increases and it is possible to learn complex associations without constraints on variable associations. According to an embodiment, it is possible to learn the class classification problems like attributes as auxiliary tasks and super categories, and then linearly combine the class classification problems in the output stage to enable effective expression. It can also include interactive learning algorithms that allow humans to check whether causal relationships have been correctly learned and to provide feedback to correct the checked causal relationships.

In another embodiment, the decision-making reason presentation unit may be implemented as an analysis module. This is a technology that regresses a time series function into a multivariate Gaussian based on various kernels, and may explain the given time series data based on the kernel combination found above by learning the optimal kernel combination representing the kernel in the Gaussian process. Furthermore, even when there are several time series data, a combination of kernels that are commonly expressed and a kernel that express the characteristics of each time series data may be learned to describe features that commonly appear in several time series data. By writing the combination of kernels found through the time series data analysis model in natural language, it is possible to describe the derivation process and the reason for the decision-making derived by the artificial intelligence to the user in the natural language.

By visualizing and texturing the decision-making process of the artificial intelligence from the user's point of view through this decision-making reason presentation unit, it is possible to describe the components involved in the decision-making process and at the same time analyze the correlation of the complex models, which may be explained by being divided into a cause factor and an effect factor. In particular, by being written in an automatic report format that may be easily understood by the user, the AI may interact with humans more precisely by providing the reason as well as the result of analyzing the data.

The firmware updating method using the low-power wireless network including the above-described steps may perform the firmware update using the low-power wireless network to divide the firmware provided by the manufacturer and transmit the divided firmware to the FOTA target terminal, thereby receiving the firmware provided by the manufacturer so even if the wireless network situation or the performance of the FOTA target terminal is not excellent.

The present disclosure been described with reference to the embodiments, but those skilled in the art will appreciate that the present disclosure can be variously modified and changed without departing from the spirit and scope of the present disclosure described in the following claim.

INDUSTRIAL APPLICATION

The present disclosure relates to a firmware updating method using a low-power wireless network, and more particularly, to a firmware updating method using a low-power wireless network, which is implemented to wirelessly upgrade a firmware on a terminal installed in a vehicle, such as a navigation system, by using the low-power wireless network.

The invention claimed is:

1. A firmware updating method using a low-power wireless network, comprising:
   receiving and registering information of a target terminal on which the firmware is updated in an update manager server from a manufacturer server, wherein receiving and registering includes:
      receiving and registering, by the update manager server, manufacturer information of the target terminal and information of vehicle terminal on which the target terminal is installed from the manufacturer server;
      storing the manufacturer information and the vehicle terminal information registered by the update manager server in a database;
      receiving and registering, by a platform, the manufacturer information and the vehicle terminal information from the update manager server;
      receiving, by the update manager server, a token which is a unique ID corresponding to the vehicle terminal information from the platform; and
      transmitting the token received from the update manager server to the manufacturer server;
      receiving, by the target terminal, the token from the manufacturer server,
   checking information of a firmware version on the target terminal using the low-power wireless network in the platform managing an update firmware on the target terminal, wherein the checking of the firmware version includes:
      the checking of the firmware version includes:
      periodically transmitting, by the target terminal, the information of the firmware version to the platform; and
      checking, by the update manager server, the information of the firmware version on the target terminal transmitted to the platform;
   receiving the update firmware from the manufacturer server in a download server and packaging the received update firmware to the target terminal, wherein packaging the received update firmware includes:
      receiving, by the download server, the firmware from the manufacturer server;
      packaging the firmware received by the download server to create a firmware for transmission to which division and security are applied;
      storing the firmware for transmission created by the download server in the database;
      uploading a firmware download directory (URL) of the firmware for transmission created by the download server to the update manager server;
      creating, by the update manager server, a firmware update notice;
      transmitting, by the update manager server, the created firmware update notice to the platform;
      transmitting a firmware update notification received by the platform to the target terminal; and
      transmitting, by the update manager server, a transmission result of the firmware update notice to the manufacturer server;
   downloading the packaged firmware from the download server in the target terminal through the low-power wireless network, wherein downloading includes:
      downloading, by the target terminal, the firmware for transmission from the download server, wherein downloading the firmware includes:
         automatically performing a firmware download at a specific time and when vehicle driving is finished wherein the automatically performing adjusts the downloading when the firmware download has failed three or more times;
         while performing the firmware download, detecting an intrusion from outside of the network;
         in response to the detecting the intrusion, duplicating primary and secondary backup files to create a plurality of sub-backup files of the firmware; and
         individually storing the created plurality of sub-backup files in different locations created according to random variables;
      transmitting, by the target terminal, the download result to the platform;

checking, by the update manager server, the download result through the platform; and transmitting, by the update manager server, the download result to the manufacturer server; and performing the firmware update by unpackaging the firmware packaged in the target terminal, the updating of the firmware includes:

preparing the firmware update by unpackaging the firmware for reception received by the target terminal;

performing, by the target terminal, the firmware update when the preparation of the update is completed;

transmitting, by the target terminal, the result of the firmware update to the platform;

checking, by the update manager server, the result of the firmware update through the platform; and transmitting, by the update manager server, the result of the firmware update to the manufacturer server, wherein the packaging the firmware received by the download server to create the firmware for transmission to which division and security are applied comprises:

dividing, by the download server, a firmware input from the manufacturer server into a plurality of blocks, which include a first block including a firmware name and a firmware version, a plurality of firmware blocks that are arranged in order after the first block and are each allocated part of firmware data to form one firmware data as a whole, and a last block arranged after the last firmware block to notify a termination of the packaging; and separately encrypting, by the download server, each block of the divided plurality of blocks of the firmware input, wherein the separately encrypting comprises:

encrypting the first block, which includes:
"Info" including the firmware name and the firmware version as a header; and
"Sign(H(Info))" that is data of hashing the information included the "info" and then signing on the hashed value of the information included the "info" as a body;

encrypting each block of the plurality of firmware blocks, which includes:
"Firmware" including the firmware name, an output value when firmware data is used as an input of a hash function, and a sign value obtained by substituting, as an input, the output value when the firmware data is used as the input of the hash function as a header;
"H(FW)" that is data of hashing the information included the "Firmware" as a body;
"Sign(H(FW))" that is data of signing on the hashed value of the "H(FW)" as another body; and encrypting the last block, which includes:
"H(F/W)" that is data of hashing the firmware data as a header;
"Sign(H(F/W))" that is data of signing on the hashed value of the "H(F/W)" as a body, wherein the preparing the firmware update by unpackaging the firmware for reception received by the target terminal comprises:

a version checking step of reading whether the firmware update of the target terminal is necessary through an info value included in the first block after a target terminal communicating with the download server decodes the first block and comparing the info value whose sign and hash are released and an info value previously included in the first block when the firmware update is necessary; and a data merging step of comparing the hash value of the firmware data whose sign is released and the hash value of the firmware data previously included in the firmware block after the target terminal downloads and decodes the firmware blocks when the version is checked in the version checking step, and merging each of the firmware data divided when the hash value of the firmware data whose sign is released is equal to the hash value of the firmware data previously included in the firmware block, and wherein the performing the firmware update comprises: when the decoding of the last block is completed, the firmware update is performed using the merged firmware data.

* * * * *